United States Patent
Al-Regib et al.

(10) Patent No.: US 9,855,930 B2
(45) Date of Patent: Jan. 2, 2018

(54) VEHICLE TRANSAXLE AND PARKING ACTUATOR ASSEMBLY

(71) Applicant: FORD GLOBAL TECHNOLOGIES, LLC, Dearborn, MI (US)

(72) Inventors: Emad Al-Regib, Westland, MI (US); Todd Curtis Spaulding, Ann Arbor, MI (US); Matthew Stephen Eiszler, Pinckney, MI (US); Gerard Patrick Kuchta, Grosse Pointe Park, MI (US); Brian Richard Light, Flat Rock, MI (US); Eric S. Richardson, Farmington Hills, MI (US); Ronald Gaw, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 14/790,161

(22) Filed: Jul. 2, 2015

(65) Prior Publication Data
US 2017/0001604 A1 Jan. 5, 2017

(51) Int. Cl.
| | |
|---|---|
| B60T 1/00 | (2006.01) |
| B60T 13/74 | (2006.01) |
| B60T 1/06 | (2006.01) |
| F16D 63/00 | (2006.01) |
| F16D 127/06 | (2012.01) |

(52) U.S. Cl.
CPC .............. B60T 1/005 (2013.01); B60T 1/062 (2013.01); B60T 13/746 (2013.01); F16D 63/006 (2013.01); F16D 2127/06 (2013.01)

(58) Field of Classification Search
CPC .................................................... B60K 41/262
USPC .......................................... 192/220.2, 219.4
See application file for complete search history.

(56) References Cited

U.S. PATENT DOCUMENTS

| | | | |
|---|---|---|---|
| 2,974,752 A * | 3/1961 | Howard | F16H 63/3475 |
| | | | 188/163 |
| 5,827,149 A | 10/1998 | Sponable | |
| 6,273,232 B1 | 8/2001 | Kimura et al. | |
| 7,934,590 B2 | 5/2011 | Duhaime et al. | |
| 2002/0084162 A1 | 7/2002 | Shafer et al. | |
| 2013/0020171 A1* | 1/2013 | Jang | B60T 1/005 |
| | | | 192/220.2 |
| 2016/0082933 A1* | 3/2016 | Iwata | B60T 1/005 |
| | | | 188/163 |

FOREIGN PATENT DOCUMENTS

WO   WO2014/203900   * 12/2014

* cited by examiner

*Primary Examiner* — Mark A Manley
(74) *Attorney, Agent, or Firm* — David Kelley; Brooks Kushman P.C.

(57) ABSTRACT

A transaxle and a parking actuator assembly are provided. The parking actuator assembly may include an actuator, a rack, and the biasing member. The actuator may include a pin biased towards an extended position. The rack may be configured to carry a parking rod and may define first and second ramped recesses each configured to receive the pin. The biasing member may be coupled with the rack and may be configured to bias the parking rod towards engagement with a parking mechanism.

18 Claims, 4 Drawing Sheets

VEHICLE TRANSAXLE AND PARKING ACTUATOR ASSEMBLY

TECHNICAL FIELD

The present disclosure relates to a vehicle transaxle and parking actuator assembly.

BACKGROUND

Automatic transmissions may be provided with a transmission range control module to control the park, reverse, neutral, and drive ranges of the automatic transmission. The transmission range control module may be an electromechanical or electrohydraulic system. The transmission range control module may be configured to selectively engage and release a parking lock pawl from a parking lock gear.

Some transmission range control modules include a compression spring used to apply force to releasably engage the parking lock pawl from the parking lock gear. A shifting arm may be provided to release the parking lock pawl when driving the vehicle and may engage the parking lock pawl when the transmission range control module is placed into the park range.

SUMMARY

In at least one embodiment a transaxle is provided. The transaxle may include a housing and a parking actuator assembly. The parking actuator assembly may be disposed within the housing and may include a solenoid, a rack, and a biasing member. The solenoid may include a pin biased towards an extended position. The rack may be operatively coupled to a parking rod and may define first and second ramped recesses each configured to receive the pin. The rack and the solenoid may be arranged such that while the rack moves between extended and retracted positions, the pin rides along the ramped recesses as the recesses move relative to the pin. The biasing member may be coupled with the rack and configured to bias the rack towards a parking mechanism.

In at least one embodiment, a transaxle is provided. The transaxle may include a housing and a parking actuator assembly disposed within the housing. The parking actuator assembly may include an actuator, a rack, and a biasing member. The actuator may include a pin biased towards an extended position. The rack may be configured to carry a parking rod and may define first and second ramped recesses each configured to receive the pin. The biasing member may be coupled with the rack and configured to bias the parking rod towards engagement with a parking mechanism.

In at least one embodiment, a parking actuator assembly is provided. The parking actuator assembly may include a solenoid, a rack, a biasing member, and a drive motor assembly. The solenoid may include a pin biased towards an extended position. The rack may be operatively coupled to a parking rod. The rack may define first and second ramped surfaces next to one another and first and second engagement surfaces on respective sides of the ramped surfaces. The biasing member may be disposed proximate the rack and may be configured to engage a stop extending from the rack and may bias the rack towards a parking mechanism. The drive motor assembly may be drivably engaged with the rack. The solenoid, the rack, and the drive motor assembly may be arranged such that while the drive assembly translates the rack from an extended position to a retracted position, the pin rides along the first ramped surface and then the second ramped surface at least until the pin engages the second engagement surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
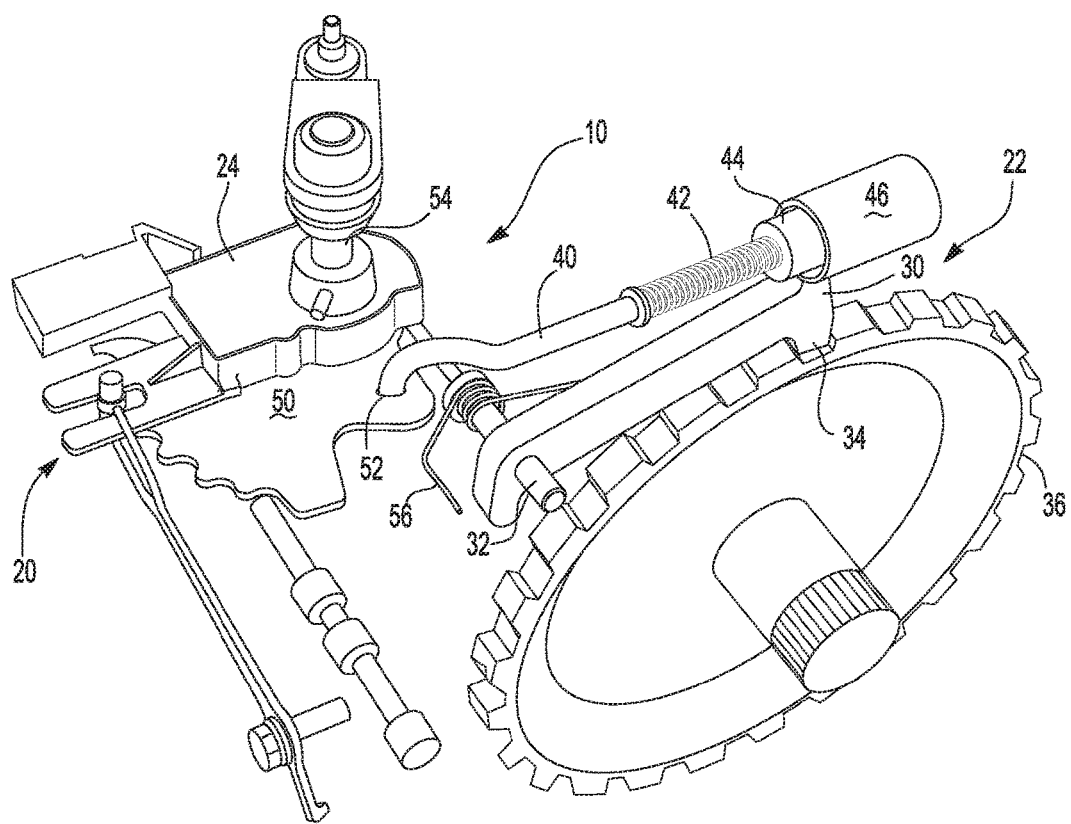
FIG. 1 is a perspective view of a current production transmission park system.

Referring to FIG. 1 a current production transmission park system 10 is shown. The transmission park system 10 may be an electronically actuated transmission park pawl-gear system configured to selectively restrict or inhibit rotation of a transmission output shaft. The transmission park system 10 may include a park actuator system 20 and a park lock mechanism 22.

The park actuator system 20 may be in communication with a transmission range sensor 24. The transmission range sensor 24 may be configured to provide a signal indicative of a transmission range such as, park, neutral, reverse, drive. The placement of the transmission in a park position may result in a park pawl 30 being rotated about a pivot pin 32. The rotation of the park pawl 30 may cause a tooth 34 of the park pawl 30 to mesh with a gear tooth of the park gear 36. The park pawl 30 may be rotated about the pivot pin 32 by the park lock mechanism 22.

The park lock mechanism 22 may include a park rod 40, a ratchet spring 42, an actuating cam 44, and a guide cup 46. The park rod 40 may be disposed between the park pawl 30 and a plate 50. The ratchet spring 42 may be disposed about the park rod 40 and interposed between the actuating cam 44 and the park rod connection to a plate 50.

The park rod 40 may be operatively connected to a slot 52 formed in the plate 50. The plate 50 may include a series of detent positions corresponding to the transmission ranges of park, neutral, reverse, and drive. The plate 50 may be attached to a shaft and lever 54. The shaft and lever 54 may be configured to pivot the plate 50 about an axis in response to movement of a transmission range selector to a position corresponding to the desired transmission range. The placement of the transmission range selector into a park position may cause the park rod 40 to longitudinally move between an output shaft rotation permitting position to an output shaft rotation restriction position.

As the park rod 40 moves, the actuating cam 44 may ride along an inclined surface formed on the park pawl 30 and/or guide cup 46 and cause the park pawl 30 to rotate about the pivot pin 32. A return spring 56 disposed about the pivot pin 32 may bias the park pawl 30 away from the output shaft rotation restriction position.

Figure 2:
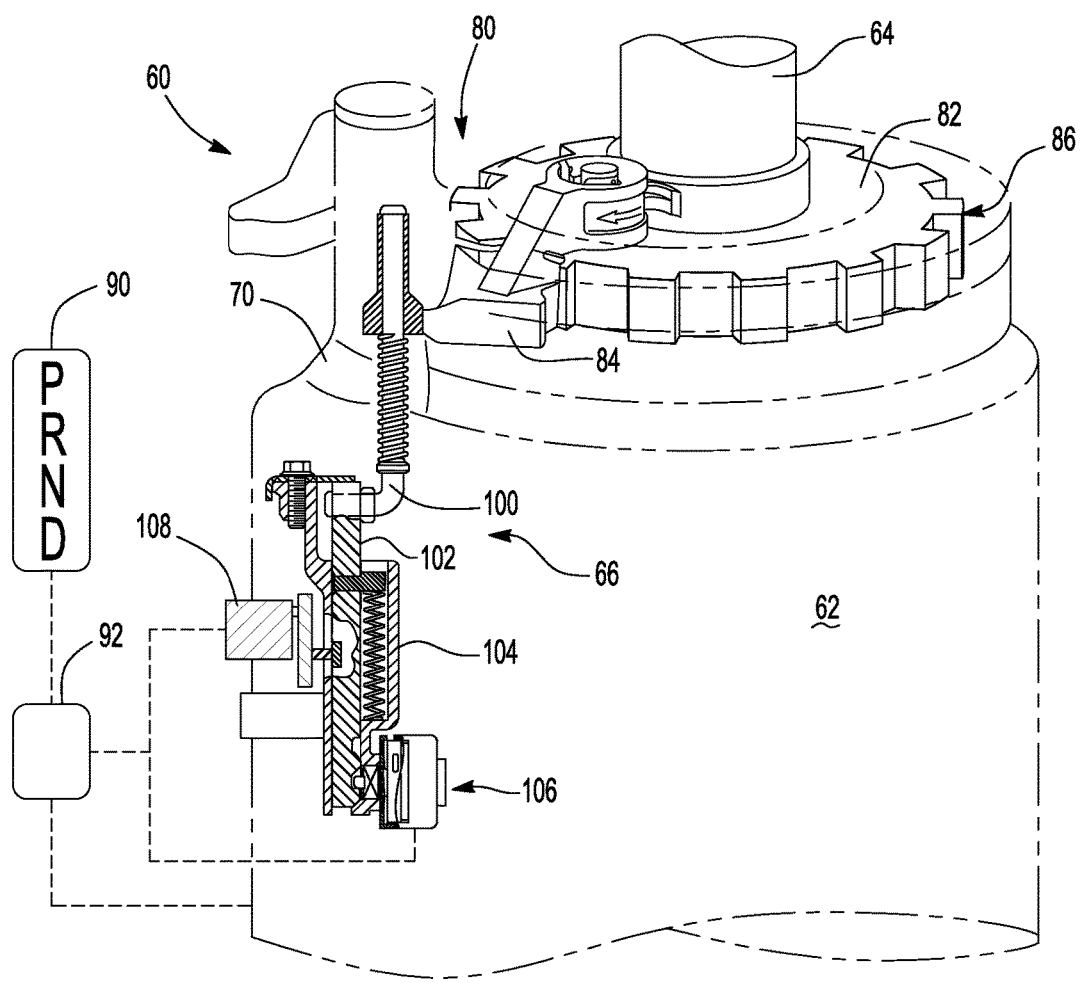
FIG. 2 is a partial side view of an exemplary transaxle.
Figure 3:
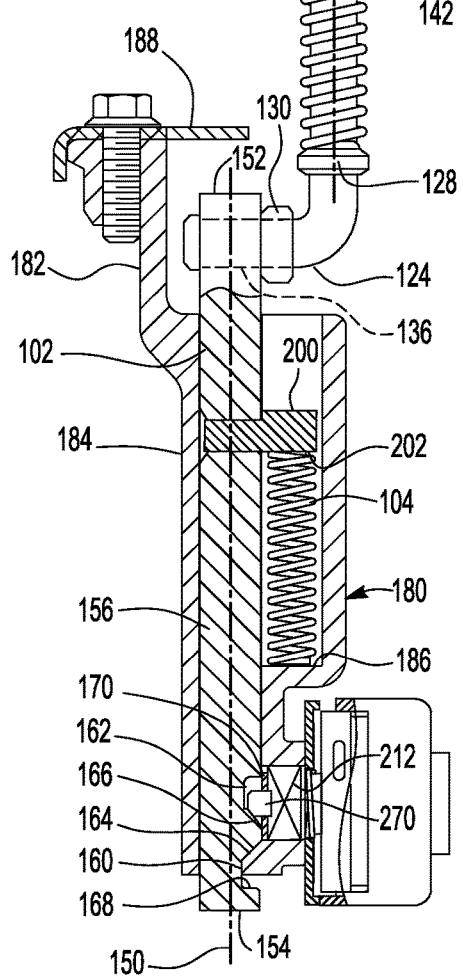
FIG. 3 is a first partial side view of an exemplary parking actuator assembly in a retracted or non-park position.

Referring to FIG. 2 a partial side view of an exemplary vehicle transaxle 60 is shown. The vehicle transaxle 60 may include a transaxle housing 62, an output shaft 64, and a parking actuator assembly 66. The transaxle housing 62 may receive at least a portion of a transmission assembly configured to provide a torque to the output shaft 64.

The parking actuator assembly 66 may be disposed within the transaxle housing 62. The parking actuator assembly 66 may be disposed on an interior surface of the transaxle housing 62. The parking actuator assembly 66 may at least partially extend through an opening 70 defined by the transaxle housing 62. The parking actuator assembly 66 may be configured to selectively actuate a parking mechanism 80 to inhibit or restrict rotation of the output shaft 64. The parking actuator assembly 66 may move between an extended position in which the parking actuator assembly 66 engages the parking mechanism 80 to restrict rotation of the output shaft 64 and a retracted position in which the parking mechanism 80 does not restrict rotation of the output shaft 64. The extended position may correspond to the parked position of the transmission assembly. The retracted position may correspond to a non-park position of the transmission assembly.

The parking mechanism 80 may include a parking gear 82 and a pawl member 84. The parking gear 82 may be rotatably disposed within or on the transaxle housing 62 proximate the opening 70. The parking gear 82 may be disposed about and fixedly coupled to the output shaft 64. The parking gear 82 may selectively rotate with the output shaft 64. The parking gear 82 may be provided with a plurality of gear teeth 86 disposed about a periphery of the parking gear 82. The pawl member 84 may be configured to selectively engage at least one of a plurality of gear teeth 86 to restrict rotation of the output shaft 64 and the parking gear 82 when the parking actuator assembly 66 engages the parking mechanism 80.

The parking actuator assembly 66 may be in communication with a transmission shifting assembly 90 and a control module 92. The transmission shifting assembly 90 may be a transmission gear shifter in communication with the transmission assembly. The transmission shifting assembly 90 may be selectively movable between several positions, such as a "park" position, a "reverse" position, a "neutral" position, and a "drive" position, corresponding to various operating ranges or operating modes of the transmission assembly. The transmission shifting assembly 90 may include a transmission range sensor configured to provide a signal indicative of a transmission assembly position to the control module 92. The transmission shifting assembly 90 via the control module 92 may provide a signal to the parking actuator assembly 66 to place the transmission assembly into the park position to restrict rotation of the output shaft 64.

Referring to FIGS. 2-5, the parking actuator assembly 66 may include a parking rod 100, a rack 102, a biasing member 104, an actuator 106, and a drive motor assembly 108. The parking rod 100 may extend along a first axis 120. The parking rod 100 may have a first end 122, a second end 124, a generally elongate body 126, a protrusion 128, and a connecting region 130. The generally elongate body 126 may extend between the first end 122 and the second end 124. The generally elongate body 126 may have an elongated cylindrical shape. The protrusion 128 may be disposed about an exterior surface of the elongate body 126 proximate the second end 124. The protrusion 128 may be disposed between the first end 122 and the connecting region 130. The connecting region 130 may be disposed proximate the second end 124 and may be configured to receive at least a portion of the rack 102.

A cam member 140 may be slidably disposed on the parking rod 100 proximate the first end 122. The cam member 140 may be configured to engage the parking mechanism 80 when the parking actuator assembly 66 is in the extended position. A ratchet member 142 may be disposed about the generally elongate body 126 and may extend between the first end 122 and the second end 124. The ratchet member 142 may be configured as a biasing member such as a linear spring or the like. The ratchet member 142 may engage the cam member 140 and the protrusion 128 to bias the cam member 140 towards the parking mechanism 80. The parking rod 100 may define a pass-through 136 disposed proximate the second end 124.

The rack 102 may extend along a second axis 150. The first axis 120 may be disposed substantially parallel to and spaced from the second axis 150. The rack 102 may have a first end 152, a second end 154, and a generally elongate body 156. The generally elongate body 156 may extend between the first end 152 and the second end 154. The generally elongate body 156 may have an elongated cylindrical shape. The rack 102 may be operatively coupled to the parking rod 100 proximate the connecting region 130. The rack 102 may be configured to carry the parking rod 100 as the rack 102 translates between extended and retracted positions as the parking actuator assembly 66 moves between extended and retracted positions.

At least a portion of the first end 152 may extend through the connecting region 130. The parking rod 100 may be loosely fit onto the rack 102 proximate the connecting region 130. In at least one embodiment, the parking rod 100 may be fixedly disposed on the rack 102 via a fastener, tabs, or the like extending through the connecting region 130.

The rack 102 may define a first recess 160 and a second recess 162 disposed proximate the second end 154. The first recess 160 may correspond to the extended position of the rack 102. The second recess 162 may correspond to the retracted position of the rack 102. The first recess 160 may be configured as a first ramped recess surface 164. The second recess 162 may be configured as a second ramped recess surface 166. The first and second ramped recess surfaces 164, 166 may be disposed next to one another. The first ramped recess surface 164 may be a first inclined surface, inclined towards the first end 152. The second ramped recess surface 166 may be a second inclined surface, inclined towards the second end 154.

The rack 102 may define first and second engagement surface 168, 170 on respective sides of the first and second ramped recess surfaces 164, 166. The first engagement surface 168 may be disposed closer to the second end 154 than the second engagement surface 170.

A mounting bracket 180 may be configured to at least partially receive the parking rod 100 and the rack 102. The mounting bracket 180 may couple the parking actuator assembly 66 to an interior surface of the transaxle housing 72. The mounting bracket 180 may have a first portion 182 and a second portion 184. The first portion 182 may be disposed proximate the parking mechanism 80 and may couple the mounting bracket 180 to the transaxle housing 72 proximate the opening 70. The second portion 184 may be disposed proximate the second end 154 of the rack 102. The second portion 184 may define a mounting bracket bearing surface 186.

The first end 152 of the rack 102 may be disposed proximate the first portion 182. The second end 154 of the rack 102 may be disposed proximate the second portion 184. A stop bracket 188 may be disposed proximate the first portion 182. The stop bracket 188 may be configured to engage the first end 152 of the rack 102 when the rack 102 is in the extended (park) position. The stop bracket 188 may be configured to inhibit further translation of the rack 102 towards the parking mechanism 80.

A stop member 200 may be operatively coupled to the rack 102. The stop member 200 may be disposed proximate the first end 152 of the rack 102 and may be spaced apart from the first and second recesses 160, 162. The stop member 200 may be disposed about and extend away from the rack 102. In at least one embodiment, the stop member 200 may be integrally formed with the rack 102. The stop member 200 may define a stop member bearing surface 202. The stop member bearing surface 202 may face towards and be spaced apart from the mounting bracket bearing surface 186.

The biasing member 104 may be at least partially received within the mounting bracket 180. The biasing member 104 may be coupled with the rack 102. The biasing member 104 may engage the mounting bracket bearing surface 186 and the stop member bearing surface 202. The biasing member 104 may be configured to bias the parking rod 100 and the rack 102 towards the parking mechanism 80 and/or the park position. The biasing member 104 may be configured as a linear spring, a linear actuator, or the like.

The mounting bracket 180 may be configured to receive the actuator 106. The actuator 106 may be disposed proximate the second portion 184 of the mounting bracket 180. The actuator 106 may include a pin 270 and an actuator biasing member 212. The actuator biasing member 212 may be configured to bias the pin 270 towards an extended position. The actuator biasing member 212 may be a linear spring having a spring constant less than the spring constant of the biasing member 104 and/or the ratchet member 142. In at least one embodiment, the actuator 106 may be a solenoid, a retractable pin mechanism, or the like. The first and second recesses 160, 162 may be configured to receive the pin 270.

The rack 102 and the actuator 106 may be arranged such that the pin 270 is received within the first recess 160 and may engage the first engagement surface 168 when the rack 102 is in the extended position. The rack 102 and the actuator 106 may be arranged such that the pin 270 rides along the first ramped recess surface 164 and then the second ramped recess surface 166 while the rack 102 moves from the extended position to the retracted position as the first and second recesses 160, 162 move relative to the pin 270. The rack 102 and the actuator 106 may be arranged such that the pin 270 is received within the second recess 162 and may engage the second engagement surface 170 when the rack 102 is in the retracted position.

Figure 4:
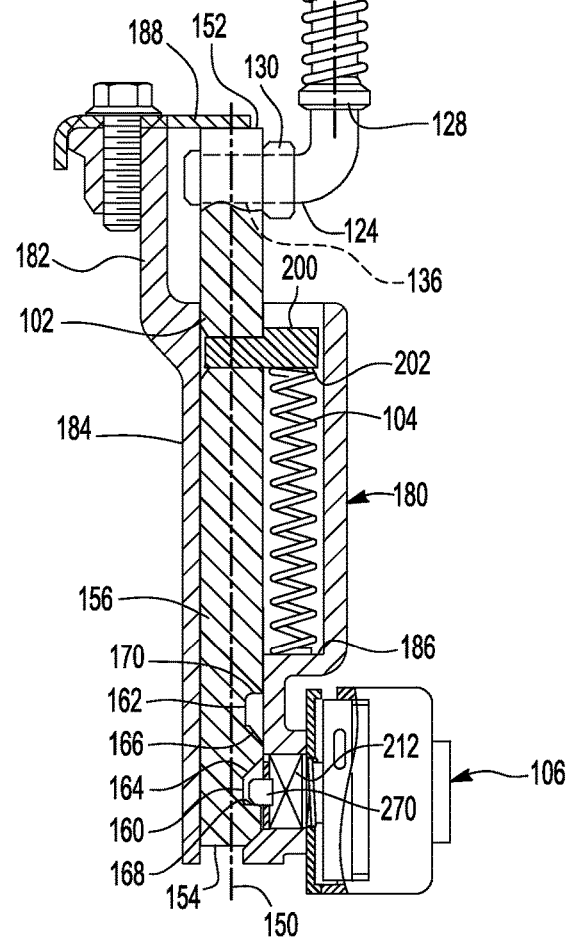
FIG. 4 is a second partial side view of the exemplary parking actuator assembly in an extended or park position.
Figure 5:
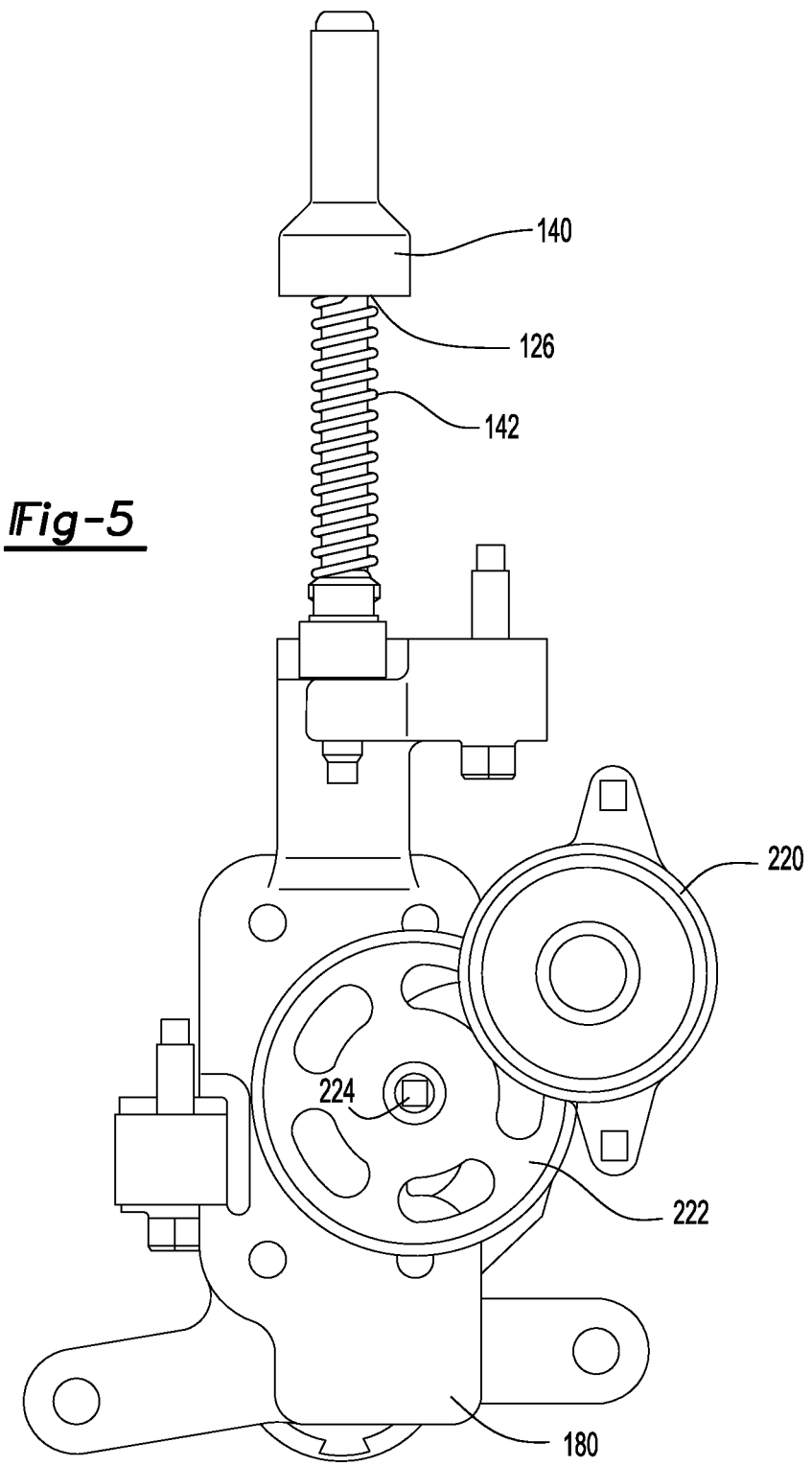
FIG. 5 is a second partial side view of the exemplary parking actuator assembly in a retracted or non-park position.

The actuator 106 may be selectively powered or activated to maintain the pin 270 in the extended position. The control module 92 may activate the actuator 106 in response to the pin 270 engaging the first engagement surface 168. The actuator 106 may maintain the pin 270 in the extended position while the rack 102 is in the extended position, as shown in FIG. 4. The pin 270 may inhibit translation of the rack 102 away from the extended position. The control module 92 may activate the actuator 106 in response to the pin 270 engaging the second engagement surface 170. The actuator 106 may maintain the pin 270 in the retracted position while the rack 102 is in the retracted position, as shown in FIG. 5. The pin 270 may inhibit translation of the rack 102 away from the retracted position.

The actuator 106 may be de-powered or deactivated such that the pin 270 is maintained in the extended position by the actuator biasing member 212. The first and second ramped recess surfaces 164, 166 may be inclined such that the translation of the first and second recesses 160, 162 relative to the pin 270, the first and second ramped recess surfaces 164, 166 force the pin 270 to at least partially retract within the actuator 106 and the pin 270 rides along the first and second ramped recess surfaces 164, 166.

The biasing member 104 and the rack 102 may be arranged such that in response to a cessation of power received by the actuator 106, the biasing member 104 urges the rack 102 from the retracted position towards the extended position to engage the parking mechanism 80. The control module 92 may deactivate the actuator 106 in response to a change in the transmission assembly position from a park position to a non-park position or a non-park position to a park position. The control module 92 may deactivate the actuator 106 in response to a loss of communication between the parking actuator assembly 66 and the control module 92. Communication between the parking actuator assembly 66 and the control module 92 may cease if a power delivery fault of the vehicle occurs.

The drive motor assembly 108 may extend at least partially through and be fixedly secured to the transaxle housing 72. The drive motor assembly 108 may be configured to engage the rack 102. The drive motor assembly 108 may include a drive motor 220, a drive gear 222, and an override feature 224. The drive motor 220 may be operatively connected to the drive gear 222. The drive gear 222 may be drivably engaged with the rack 102. In response to operation of the drive motor 220, the drive gear 222 rotates and translates the rack 102 from the extended position to the retracted position. In at least one embodiment, the drive motor assembly 108 may be configured to translate the rack 102 from the retracted position to the extended position.

The drive motor assembly 108 and the actuator 106 may be arranged such that in response to the actuation of the transmission shifting assembly 90 to change the transmission assembly from a park position to a non-park position, the control module 92 de-activates the actuator 106. The drive motor assembly 108 may translate the rack 102 from the extended position to the retracted position. The drive motor assembly 108 and the actuator 106 may be arranged such that in response the actuation of the transmission shifting assembly 90 to change the transmission assembly from a non-park position to a park position, the control module 92 de-activates the actuator 106. The biasing member 104 may urge the rack 102 from the retracted position towards the extended position to engage the parking mechanism 80.

The override feature 224 may be disposed on or within the drive gear 222. The override feature 224 may be configured to receive a tool, such as a hex wrench or an Allen wrench, or a similar tool that may engage the override feature 224. The rotation of the tool and the override feature 224 may operate the drive gear 222 to translate the rack 102 from the extended position to the retracted position or from the retracted position to the extended position.

An access cover may be disposed over the transaxle housing 72. The access cover may provide access to the drive motor assembly 108 such that the tool may be inserted into the override feature 224.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transaxle comprising:
    a housing; and
    a parking actuator assembly disposed within the housing and including
        a solenoid including a pin biased towards an extended position,
        a rack operatively coupled to a parking rod and defining first and second ramped recesses, the first ramped recess defining a first engagement surface and the second ramped recess defining a second engagement surface, each ramped recess being configured to receive the pin, wherein the rack and solenoid are arranged such that while the rack moves between extended and retracted positions, the pin rides along the ramped recesses as the recesses move relative to the pin until the pin engages the second engagement surface, and
        a biasing member coupled with the rack and configured to bias the rack towards a parking mechanism.

2. The transaxle of claim 1 wherein the first ramped recess corresponds to the extended position of the rack and the second ramped recess corresponds to the retracted position of the rack.

3. The transaxle of claim 1 wherein the parking actuator assembly is in communication with a control module configured to provide a signal indicative of a transmission range.

4. The transaxle of claim 3 wherein the parking actuator assembly further includes a drive motor assembly configured to engage the rack, wherein the drive motor assembly and the solenoid are arranged such that in response to a signal indicative of a change of the transmission from a park position to a non-park position, the solenoid is deactivated and the drive motor assembly translates the rack from the extended position to the retracted position and while the rack translates, the pin rides along a surface of the first ramped recess and a surface of the second ramped recess.

5. The transaxle of claim 4 wherein in response to a loss of communication between the parking actuator assembly and the control module, the solenoid is deactivated and the biasing member urges the rack from the retracted position towards the extended position to engage the parking mechanism, and while the rack translates, the pin rides along the surface of the second ramped recess and the surface of the first ramped recess.

6. The transaxle of claim 1 wherein in response to the pin engaging the second engagement surface, the solenoid is activated such that the pin inhibits translation of the rack away from the retracted position.

7. A transaxle comprising:
    a parking actuator assembly disposed within a housing, including
        an actuator including a pin biased between extended and retracted positions,
        a rack configured to carry a parking rod, and defining first and second ramped recesses having first and second engagement surfaces, each configured to receive the pin, wherein the pin engages the second engagement surface in the retracted position, and
        a biasing member coupled with the rack to bias the parking rod.

8. The transaxle of claim 7 wherein the biasing member is a linear spring.

9. The transaxle of claim 7 wherein the actuator includes an actuator biasing member configured to bias the pin towards the extended position.

10. The transaxle of claim 7 wherein the parking rod extends along a first axis and the rack extends along a second axis.

11. The transaxle of claim 10 wherein the first axis is disposed substantially parallel and spaced from the second axis.

12. The transaxle of claim 7 wherein the parking actuator assembly further includes a stop member operatively coupled to the rack and spaced apart from the first and second ramped recesses, and wherein the stop member defines a first bearing surface.

13. The transaxle of claim 12 wherein the parking actuator assembly further includes a mounting bracket configured to at least partially receive the rack and the biasing member and to couple the parking actuator assembly to an interior surface of the housing, and wherein the mounting bracket defines a second bearing surface.

14. The transaxle of claim 13 wherein the biasing member is configured to engage the first bearing surface and the second bearing surface.

15. A parking actuator assembly comprising:
    a solenoid including a pin biased towards an extended position;
    a rack operatively coupled to a parking rod and defining first and second ramped surfaces next to one another, and first and second engagement surfaces on respective sides of the ramped surfaces;
    a stop disposed proximate an end of the rack;
    a biasing member disposed proximate the rack and configured to engage a stop extending from the rack and bias the rack towards a parking mechanism; and
    a drive motor assembly drivably engaged with the rack, wherein the solenoid, the rack, and the drive motor assembly are arranged such that while the drive assembly translates the rack from an extended position to a retracted position, the pin rides along the first ramped surface and then the second ramped surface at least until the pin engages the second engagement surface.

16. The parking actuator assembly of claim 15 wherein the biasing member and the rack are arranged such that in response to a cessation of power received by the solenoid, the biasing member urges the rack towards the extended position and while the biasing member translates the rack from the retracted position to the extended position, the pin rides along the second ramped surface and the first ramped surface at least until the rack engages the stop and the pin engages the first engagement surface to inhibit further translation of the rack.

17. The parking actuator assembly of claim 15 wherein the drive motor assembly extends at least partially through and is fixedly secured to a transaxle housing.

18. The parking actuator assembly of claim 15 wherein the drive motor assembly includes an override feature disposed on a drive gear configured to engage the rack, wherein the override feature is configured to receive a tool such that in response to rotation of the tool, the drive gear translates the rack from the extended position to the retracted position.

* * * * *